(12) United States Patent
Ju

(10) Patent No.: US 7,495,419 B1
(45) Date of Patent: Feb. 24, 2009

(54) APPARATUS AND METHOD FOR PFM BUCK-OR-BOOST CONVERTER WITH SMOOTH TRANSITION BETWEEN MODES

(75) Inventor: Shu-Ing Ju, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 309 days.

(21) Appl. No.: 11/397,425

(22) Filed: Apr. 3, 2006

(51) Int. Cl.
G05F 1/62 (2006.01)
(52) U.S. Cl. .................. 323/259; 323/225; 323/284
(58) Field of Classification Search .......... 323/259, 323/225, 284, 222–224, 285
See application file for complete search history.

(56) References Cited

U.S. PATENT DOCUMENTS

| | | | |
|---|---|---|---|
| 6,166,527 A | 12/2000 | Dwelley et al. | |
| 6,515,457 B1 | 2/2003 | Maniktala | |
| 6,825,642 B2 * | 11/2004 | Brooks | 323/272 |
| 7,157,888 B2 * | 1/2007 | Chen et al. | 323/224 |
| 7,265,524 B2 * | 9/2007 | Jordan et al. | 323/225 |
| 7,298,119 B1 * | 11/2007 | Amram Summit et al. | 323/225 |
| 2003/0090246 A1 * | 5/2003 | Shenai et al. | 323/259 |
| 2004/0141341 A1 * | 7/2004 | Higashitani et al. | 363/59 |

OTHER PUBLICATIONS

LTC3440 Data Sheet, "Micropower Synchronous Buck-Boost DC/DC Converter," Linear Technology Corporation (2001).

Chen et al., "Buck-Boost PWM Converters Having Two Independently Controlled Switches," 2001 IEEEE 32nd Annual Power Electronics Specialists Conference (PESC), 2(17-21):736-741 (2001).

Cheng et al., "Chaos Study and Parameter-Space Analysis of the DC-DC Buck-Boost Converter," IEE Proc.-Electr. Power Appl., 150(2):126-138 (2003).

Feng et al., "An Adaptive Current Mode Fuzzy Logic Controller for DC-to-DC Converters," 2003 IEEE Applied Power Electronics Conference (APEC), pp. 983-989 (2003).

Gaboriault et al., "A High Efficiency, Non-Inverting, Buck-Boost DC-DC Converter," 2004 19th Annual IEEE Applied Power Electronics Convergence and Exposition (APEC '04), 3:1411-1415 (2004).

Midya et al., "Tracking Power Converter for Supply Modulation of RF Power Amplifiers," 2001 IEEE 32nd Annual Power Electronics Speialists Conference (PESC), 3(17-21):1540-1545 (2001).

(Continued)

*Primary Examiner*—Akm E Ullah
*Assistant Examiner*—Harry Behm
(74) *Attorney, Agent, or Firm*—Darby & Darby P.C.; Matthew M. Gaffney

(57) ABSTRACT

A PFM buck-or-boost converter is provided. The converter includes, inter alia, a hysteretic comparator, current sense circuitry, a logic circuit, drivers, current sense circuitry, a first buck switch, and a first boost switch. The current sense circuitry asserts signal Z if the current through the boost switch (from the load to the inductor) is greater than zero, and unasserts Z otherwise. Additionally, the current sense circuitry asserts signal I if the current through the buck switch is greater than a fixed current limit value, and unasserts I otherwise. The logic circuit employs the hysteretic comparator output, signal Z, and signal I to control the switches, and to determine whether to operate in buck regulation mode or boost regulation mode.

21 Claims, 11 Drawing Sheets

OTHER PUBLICATIONS

Midya et al., "Buck or Boost Tracking Power Converter," IEEE Power Electronics Letters, 2(4):131-134 (2004).

Nguyen et al., "A Tracking Control Method for Boost and Buck-Boost Converters Using Input Current Prediction and Load Current Feedforward," 1997 28th Annual IEEE Power Electonics Specialists Conference (PESC), 1(22-27):189-196 (1997).

Rogers, E., "Understanding Buck-Boost Power Stages in Switch Mode Power Supplies," Texas Instruments, Application Report, SLUA059A, pp. 1-32 (2002).

Sahu et al., "A High-Efficiency Linear RF Power Amplifier with a Power-Tracking Dynamically Adaptive Buck-Boost Supply," IEEE Transactions on Microwave Theory and Techniques, 52(1):112-120 (2004).

Sahu et al., "A Low Voltage, Dynamic, Noninverting, Synchronous Buck-Boost Converter for Portable Applications," IEEE Transactions on Power Electronics, 19(2):443-452 (2004).

Liqing et al., "Computation of Lyapunov Exponents for a Current-Programmed Buck-Boost Converter," 2nd International Workshop on Autonomous Decentralized System, 6-7:273-276 (2002).

* cited by examiner

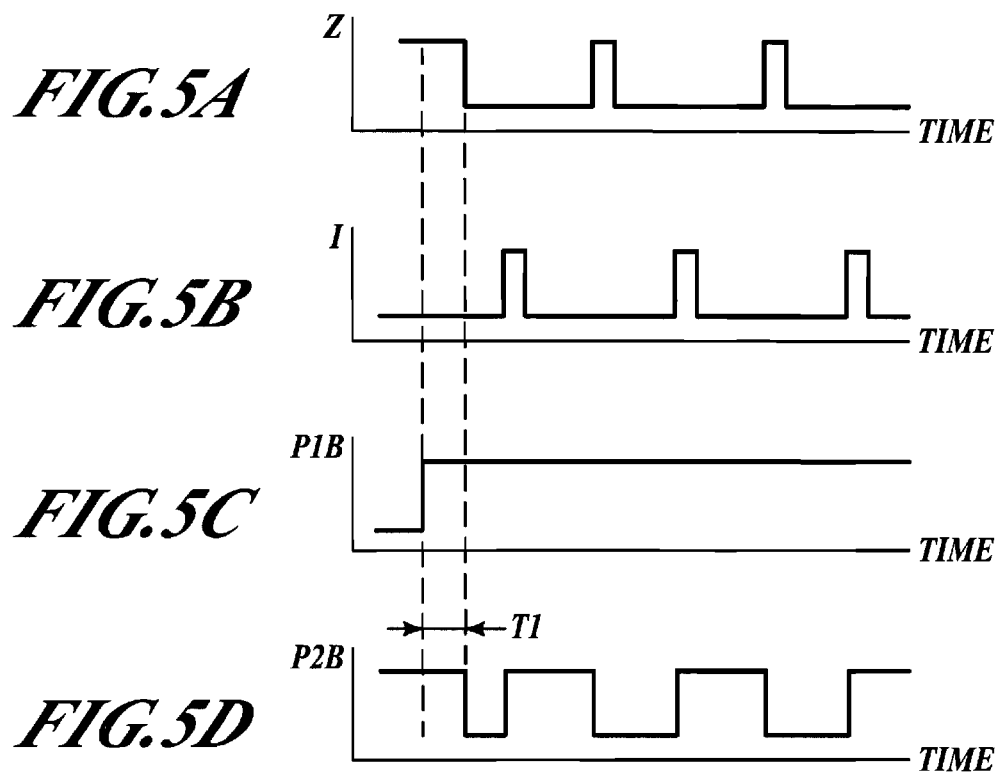

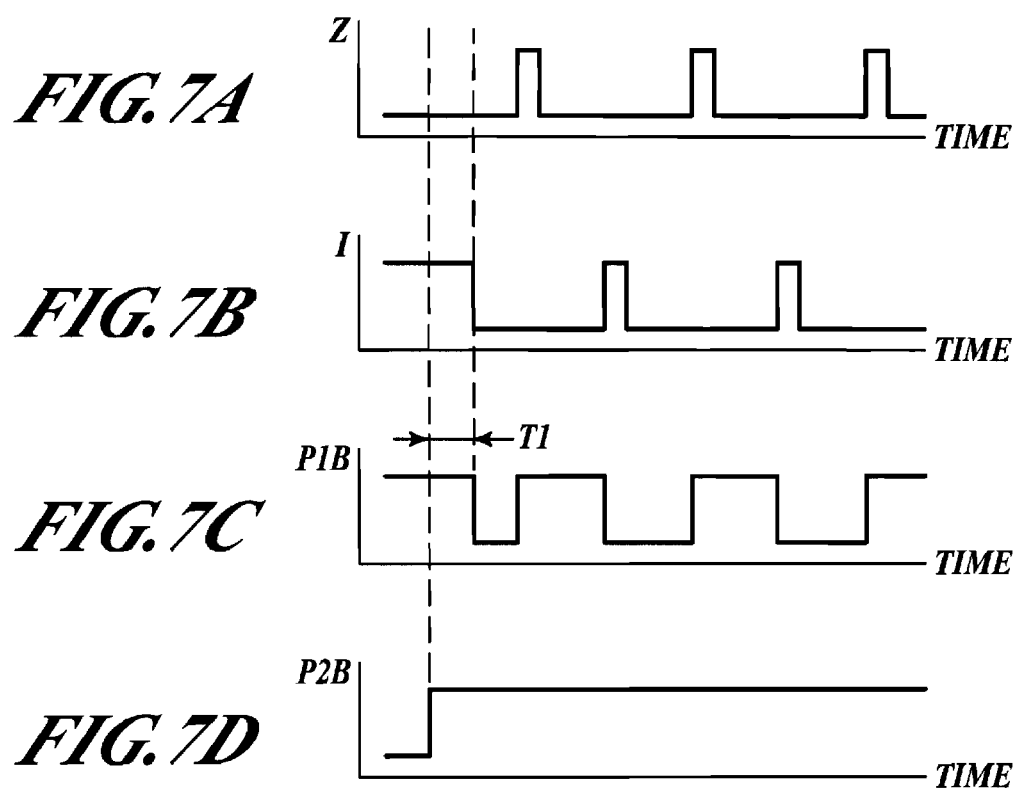

APPARATUS AND METHOD FOR PFM BUCK-OR-BOOST CONVERTER WITH SMOOTH TRANSITION BETWEEN MODES

FIELD OF THE INVENTION

The invention is related to converters, and in particular, to an apparatus and method for a PFM buck-or-boost DC-DC converter with a smooth transition between buck and boost modes.

BACKGROUND OF THE INVENTION

A buck regulator may be used to generate a regulated output voltage than is less than the input voltage; conversely, a boost converter may be used to generate a regulated output voltage that is greater than the input voltage. However, DC-DC converters with step up/step down characteristics need to be used when the input and output voltage ranges overlap. Several different topologies may be used, such as SEPIC, Cuk, a one-mode buck/boost regulator, a three-mode buck/boost regulator, and the like. However, these topologies are inferior to both boost and buck regulation for efficiency and other reasons. A one mode buck/boost regulator operates in buck/boost mode only. A three-mode buck/boost regulator operates in three modes. If the input voltage is significantly greater than the output voltage, the three-mode buck/boost regulator operates in buck mode. If the input voltage is significantly less than the output voltage, the three-mode buck/boost regulator operates in boost mode. If the input voltage and the output voltage are relatively close to each other, it operates in buck/boost mode. In a typical buck/boost topology, in buck/boost mode the boost switches and the buck switches are switching during the same cycle. However, buck/boost mode is inferior to buck mode or boost mode in terms of efficiency and other performance parameters.

A buck-or-boost (BOB) PFM regulator operates in two modes: boost mode or buck mode. Typically, in a BOB PFM regulator, the input voltage is compared to the desired output voltage, and the circuit operates in either buck mode or boost mode depending on the result of the comparison. However, conventional BOB regulators typically have large output ripple and glitches when changing from buck mode to boost mode or vice versa.

BRIEF DESCRIPTION OF THE DRAWINGS

Non-limiting and non-exhaustive embodiments of the present invention are described with reference to the following drawings, in which:

FIGS. 5A-D illustrate timing diagrams of waveforms of embodiments of signals for an embodiment of the converter of FIG. 2 for a transition from buck mode to boost mode;

FIGS. 7A-D show timing diagrams of waveforms of embodiments of signals for an embodiment of the converter of FIG. 2 for a transition from boost mode to buck mode;

DETAILED DESCRIPTION

Figure 1:
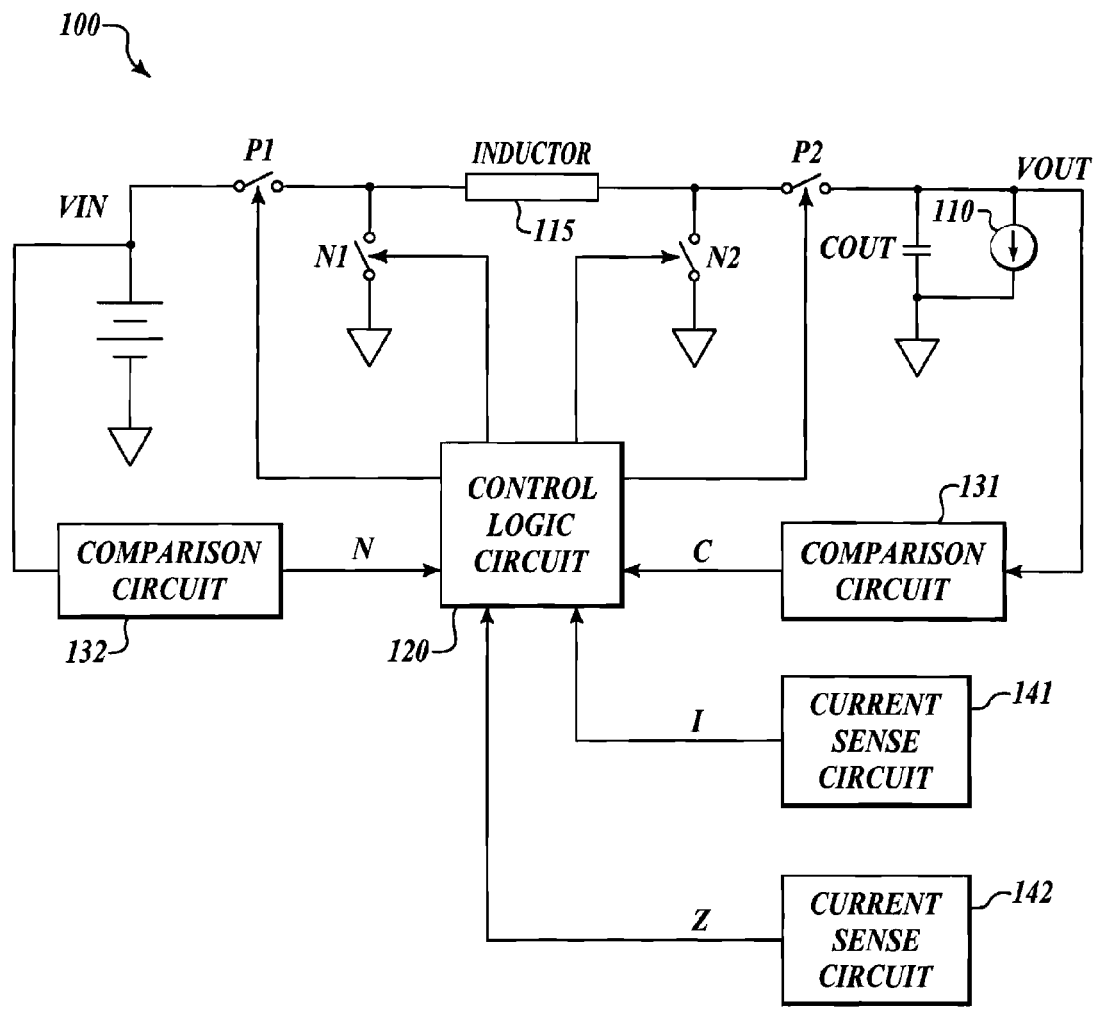
FIG. 1 illustrates a block diagram a converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a PFM buck-or-boost converter. In one embodiment, the converter includes, inter alia, a hysteretic comparator, current sense circuitry, a logic circuit, drivers, current sense circuitry, a first buck switch, and a first boost switch. In one embodiment, the converter operates as follows. The current sense circuitry asserts signal Z if the current through the boost switch (from the load to the inductor) is greater than zero, and unasserts Z otherwise. Additionally, the current sense circuitry asserts signal I if the current through the buck switch is greater than a fixed current limit value, and unasserts I otherwise. The logic circuit employs the hysteretic comparator output, signal Z, and signal I to control the switches, and to determine whether to operate in buck regulation mode or boost regulation mode.

FIG. 1 illustrates a block diagram of an embodiment of converter 100. In one embodiment, converter 100 includes comparison circuits 131 and 132; current sense circuits 141 and 142; control logic circuit 120; switches N1, N2, P1, and P2; inductor 102; output capacitor Cout; and load 110.

In operation, comparison circuit 131 compares regulated output voltage Vout with a reference voltage. In one embodiment, comparison circuit 132 is operable to provide signal N based, in part, on input signal Vin. Also, current sense circuit 141 is operable to determine current conditions associated with switch P1, and to provide signal I based on the determination. Similarly, current sense circuit 142 is operable to determine current conditions associated with switch P2, and to provide signal Z based on the determination.

Further, in one embodiment, control logic circuit 120 is operable to control switches P1, N1, P2, and N2. Converter 100 is a PFM BOB converter. Control logic circuit 120 is operable to control the switches such that, at any given time during operation, converter 100 operates in either buck mode or boost mode. In one embodiment, during buck mode, control logic circuit 120 controls the switches so that: switch P2 is always on during buck mode, and switch N2 is always off during buck mode. During boost mode, control logic circuit 120 controls the switches so that: switch P1 is always on during boost mode, and switch N1 is always off during boost mode.

Figure 10:
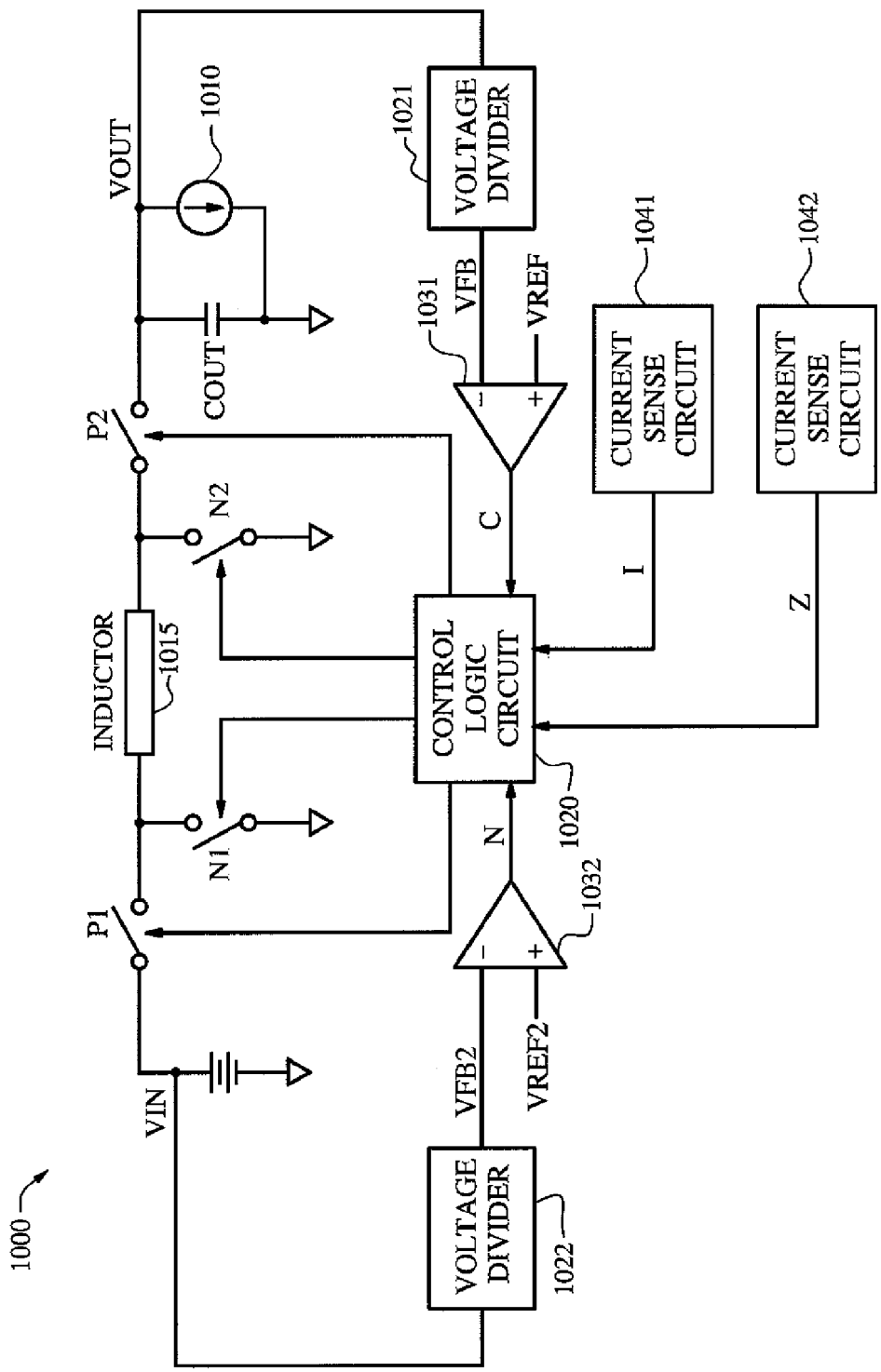
FIG. 10 illustrates a block diagram of an embodiment of the converter of FIG. 1, in accordance with aspects of the invention.

In one embodiment, comparison circuit 131 includes a hysteretic comparator and a voltage divider (not shown in FIG. 1) (as shown in FIG. 10 in one embodiment). In this embodiment, the voltage divider provides a feedback voltage from the output voltage. Also, in this embodiment, the hysteretic compares the feedback voltage with a reference voltage.

At power on, control logic circuit 120 determines whether to begin regulating the output voltage with buck regulation or boost regulation. In one embodiment, comparison circuit 132 is similar to comparison circuit 131, except the comparison circuit 132 makes a comparison based on the input voltage rather than the output voltage. In this embodiment, this comparison enables a rough determination to be made as to whether Vin is less than or greater than the desired output voltage. Also, in this embodiment, control logic circuit 120 begins the regulation in either buck regulation or boost regulation based on the output of the comparator (not shown) in comparison circuit 132.

Additionally, control logic circuit 120 is operable to determine whether to change from buck mode to boost mode, or vice versa. This determination is made, at least in part, based on signals Z and I. Using signals Z and I allows for a more precise determination of whether to operate in buck mode or boost mode, particularly when the input voltage is close to the desired output voltage, and thus simply making an input voltage comparison is insufficient to make an accurate determination of whether to operate in buck mode or boost mode for a BOB converter.

Although a particular embodiment of regulator 100 is illustrated in FIG. 1, many variations of the circuit shown in FIG. 1 are within the scope and spirit of the invention. As an example, FIG. 1 illustrates an embodiment in which voltage Vin is provided by a battery. However, in other embodiments, voltage Vin may be provided from a source other than a battery. As yet another example, FIG. 1 illustrates a synchronously-rectified embodiment of circuit 100. In another embodiment, circuit 100 is an asynchronous-rectified regulator, and switches N1 and N2 are replaced with diodes. These embodiments and others are within the scope and spirit of the invention.

Figure 2:
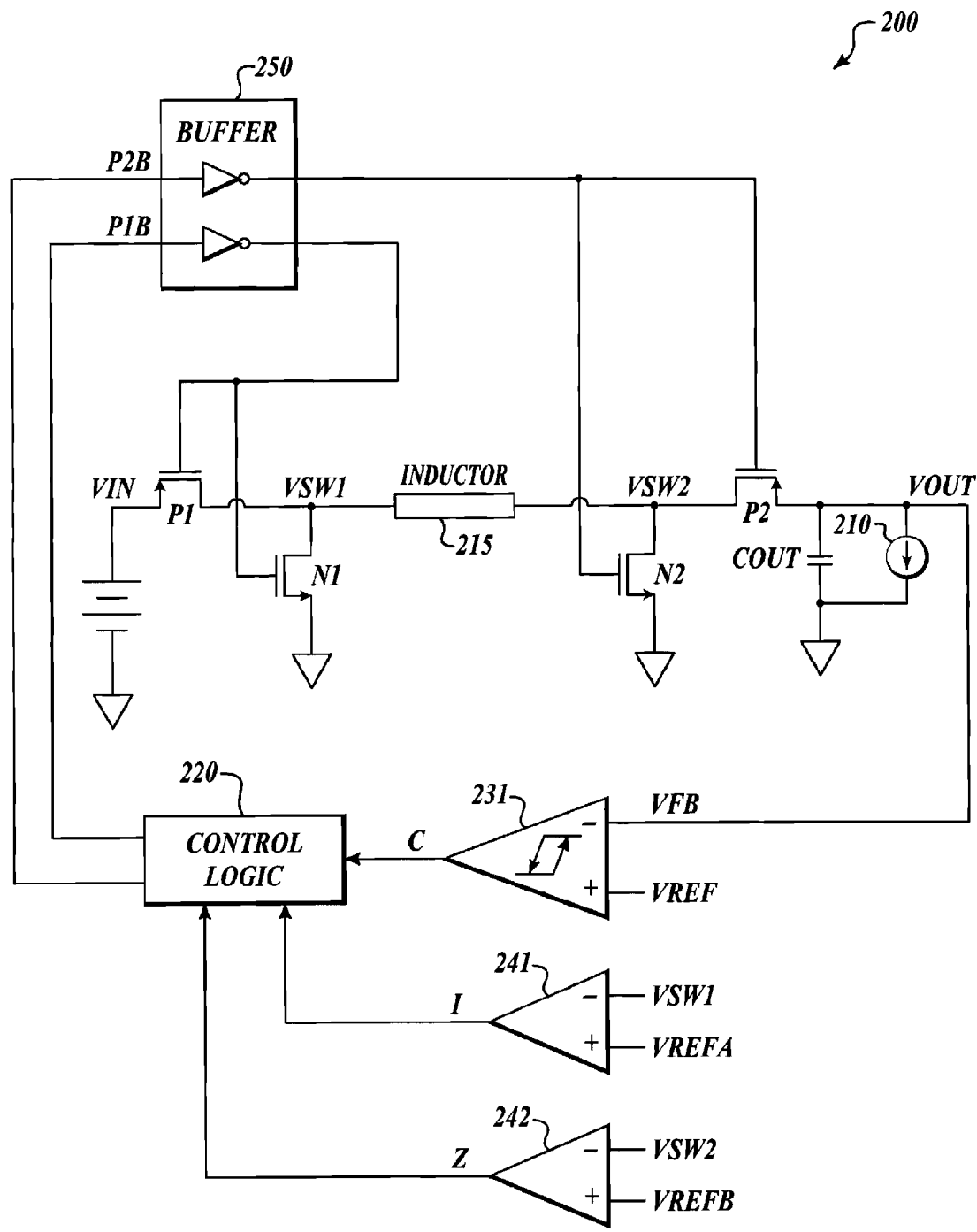
FIG. 2 shows a block diagram of an embodiment of the converter of FIG. 1.
Figure 3A:
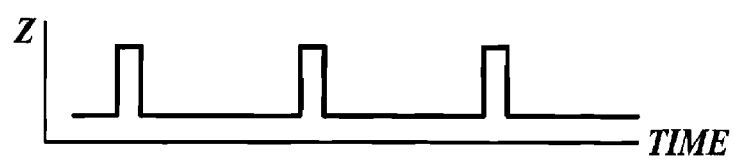
FIGS. 3A-D illustrate timing diagrams of waveforms of embodiments of signals for an embodiment of the converter of FIG. 2 during normal buck operation.
Figure 3B:
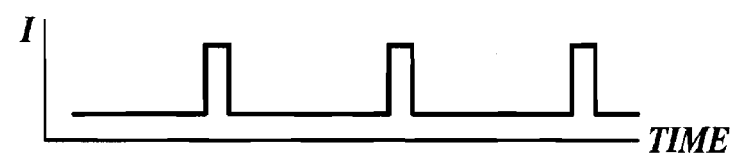
Figure 3C:
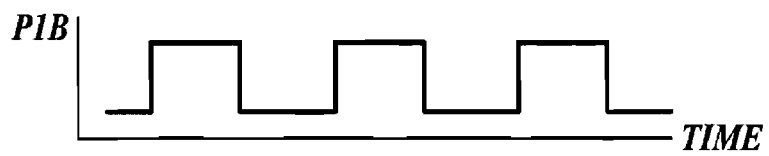
Figure 3D:
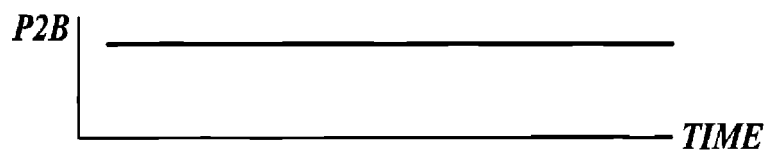
Figure 4A:
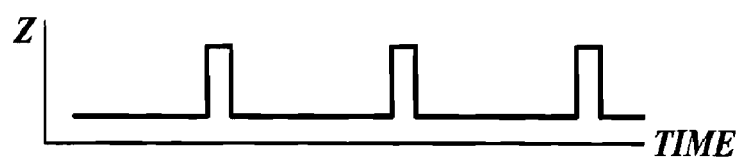
FIGS. 4A-D show timing diagrams of waveforms of embodiments of signals for an embodiment of the converter of FIG. 2 during normal boost operation.
Figure 4B:
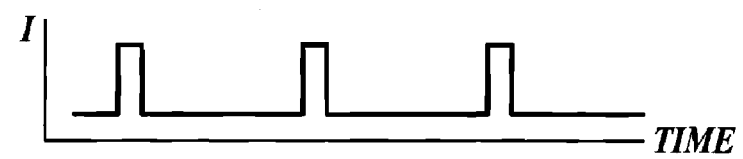
Figure 4C:
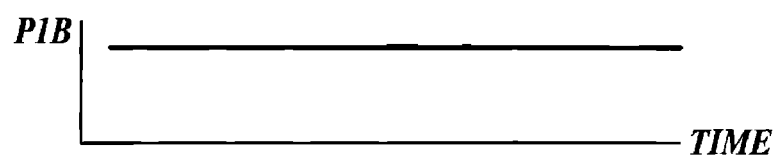
Figure 4D:
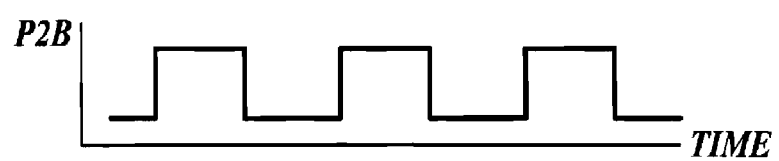
Figure 6A:
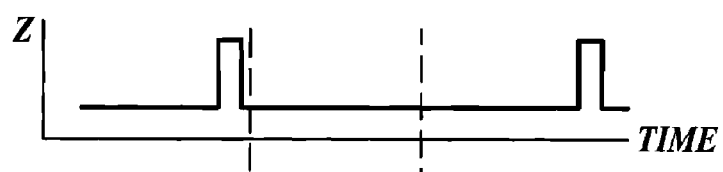
FIGS. 6A-D illustrate timing diagrams of waveforms of embodiments of signals for an embodiment of the converter of FIG. 2 for another transition from buck mode to boost mode.
Figure 6B:
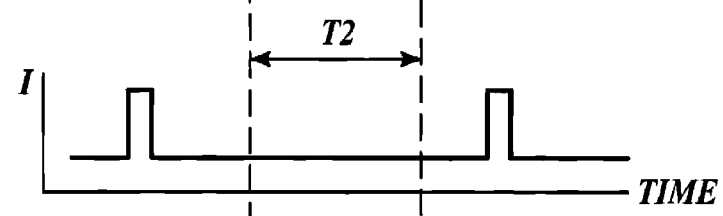
Figure 6C:
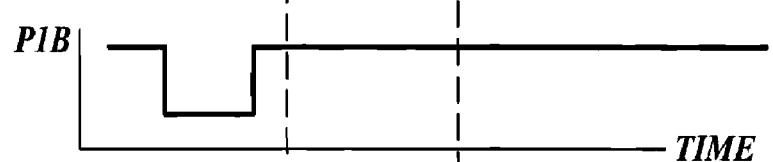
Figure 6D:
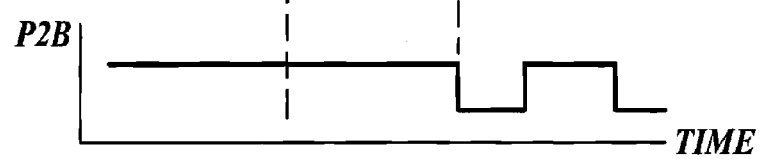
Figure 8A:
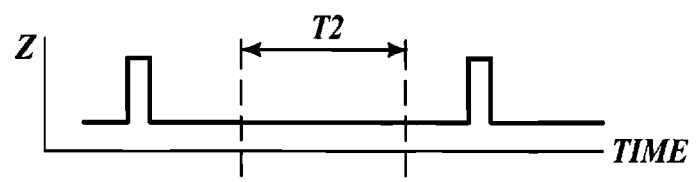
FIGS. 8A-D show timing diagrams of waveforms of embodiments of signals for an embodiment of the converter of FIG. 2 for another transition from boost mode to buck mode.
Figure 8B:
Figure 8C:
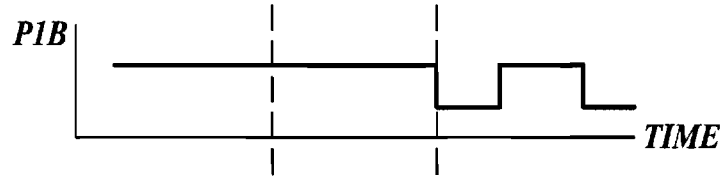
Figure 8D:
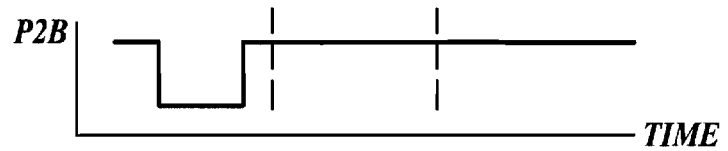

FIG. 2 shows a block diagram of an embodiment of converter 200, which may be employed as an embodiment of converter 100 of FIG. 1. Hysteretic comparator 231 is an embodiment of comparison circuit 131 of FIG. 1. Comparator 241 is an embodiment of current sense circuit 141 of FIG. 1. Similarly, comparator 242 is an embodiment of current sense circuit 142 of FIG. 1.

In operation, comparator 241 asserts signal I if the current through transistor P1 is greater than a fixed current limit value, and to unassert signal I otherwise. Similarly, comparator 242 is operable to assert signal Z if the current through transistor P2 is greater than another fixed current limit value, and to unassert signal Z otherwise. In one embodiment, the fixed current limit value for signal Z is zero, so that signal Z is asserted if the polarity of the current through transistor P2 is positive (i.e. passing from load 210 to inductor 215), and unasserted if the polarity of the current through transistor P2 is negative (i.e. passing from inductor 215 to load 210).

Although not shown in FIG. 2, regulator 200 may include a comparison circuit such as comparison circuit 132 of FIG. 1. In one embodiment, the comparison circuit includes a comparator and a voltage divider (as shown in FIG. 10 in one embodiment). The voltage divider provides a feedback signal from the input signal. The comparator compares the feedback signal to a reference signal. The output of the comparator is provided as signal N to control logic block 220.

In one embodiment, control logic circuit 220 is operable to determine of whether to change from buck mode to boost mode is based (1), at least in part, on whether I is asserted for a pre-determined period time. In another embodiment, control logic circuit 220 is operable to determine of whether to change from buck mode to boost mode is based (2), at least in part, on whether Z is unasserted for another pre-determined period time. In yet another embodiment, control logic circuit is operable to determine whether to change from buck mode to boost mode based on both (1) and (2) above, and to additionally change from buck mode to boost mode (3) on the rising edge of signal C if signal N is unasserted during the rising of signal C.

In one embodiment, control logic circuit 220 is operable to determine of whether to change from boost mode to buck mode is based (4), at least in part, on whether Z is asserted for a pre-determined period time. In another embodiment, control logic circuit 220 is operable to determine of whether to change from boost mode to buck mode is based (5), at least in part, on whether I is unasserted for a pre-determined period time. In yet another embodiment, control logic circuit is operable to determine whether to change from boost mode to buck mode based on both (4) and (5) above, and to additionally change from boost mode to buck mode (6) on the rising edge of signal C if signal N is asserted during the rising of signal C.

In one embodiment, there are three possible outcomes of the input comparison provided by signal N: (A) the input voltage Vin is significantly greater than the desired output voltage Vdout, in which case N is asserted, (B) Vin is significantly greater than Vdout, in which case N is unasserted, or (C) Vin is relatively close to Vdout, in which case neither condition (3) nor (6) above is met, and the operating mode remains unchanged.

In one embodiment, control logic circuit 220 includes one or more timers (not shown) for determining the time out conditions described above. For example, in one embodiment, the determination of conditions by control logic 220 (1) and (3) employ a first timer of about two microseconds, and conditions (2) and (4) employ a second timer. However, the invention is not so limited, and different values for the pre-determined time may be employed in different embodiments.

The phrase "at least in part" as used above, because whether the condition is met is not necessarily the sole criteria used. For example, in one embodiment, a timer for conditions such as (1), (2), (4), and (5) above are only started under certain conditions. For example, in one embodiment, the timer for condition (1) above is started if and only if: in buck mode, switch P2 is on, and Z is not high. Under this condition, the timer is started. The timer continues until either Z goes low—in which case the timer is reset and turned off—or the timer expires without Z going low—in which case control logic circuit 220 changes the operation from buck mode to boost mode. In this embodiment, condition (1) is not a sufficient condition for changing from buck mode to boost mode, because the timer is only started at a certain point in the algorithm. Accordingly, the phrase "at least in part" is used above with regard condition (1). Similarly, in one embodiment, the other timers may be started only at a particular point in the algorithm, albeit a different point for each timer. One embodiment of an algorithm for the control provided by control logic block 220 is described below with regard to FIG. 9A. However, control logic block 220 is not limited to the algorithm illustrated in FIG. 9A, which is shown and described by way of example only.

Although a particular embodiment of regulator 200 is illustrated in FIG. 1, many variations of the circuit shown in FIG. 2 are within the scope and spirit of the invention. For example, various embodiments of regulator 200 may include more or less components than illustrated in FIG. 2. For example, as previously described, although not shown in FIG. 2, regulator 200 may include a voltage divider that provides voltage Vfb from voltage Vout.

Further, although particular embodiments of the switches P1, N1, P2, and N2 are shown in FIG. 2, other embodiments of the switches are within the scope and spirit of the invention. For example, although field effect transistors are illustrated in FIG. 2, in other embodiments, bipolar transistors or the like may instead by used. Also, one of more of the p-type transistors may be replaced with n-type transistors, and vice versa, with a corresponding change in the logic controlling the switch. These embodiments and others are within the scope and spirit of the invention.

Figure 9A:
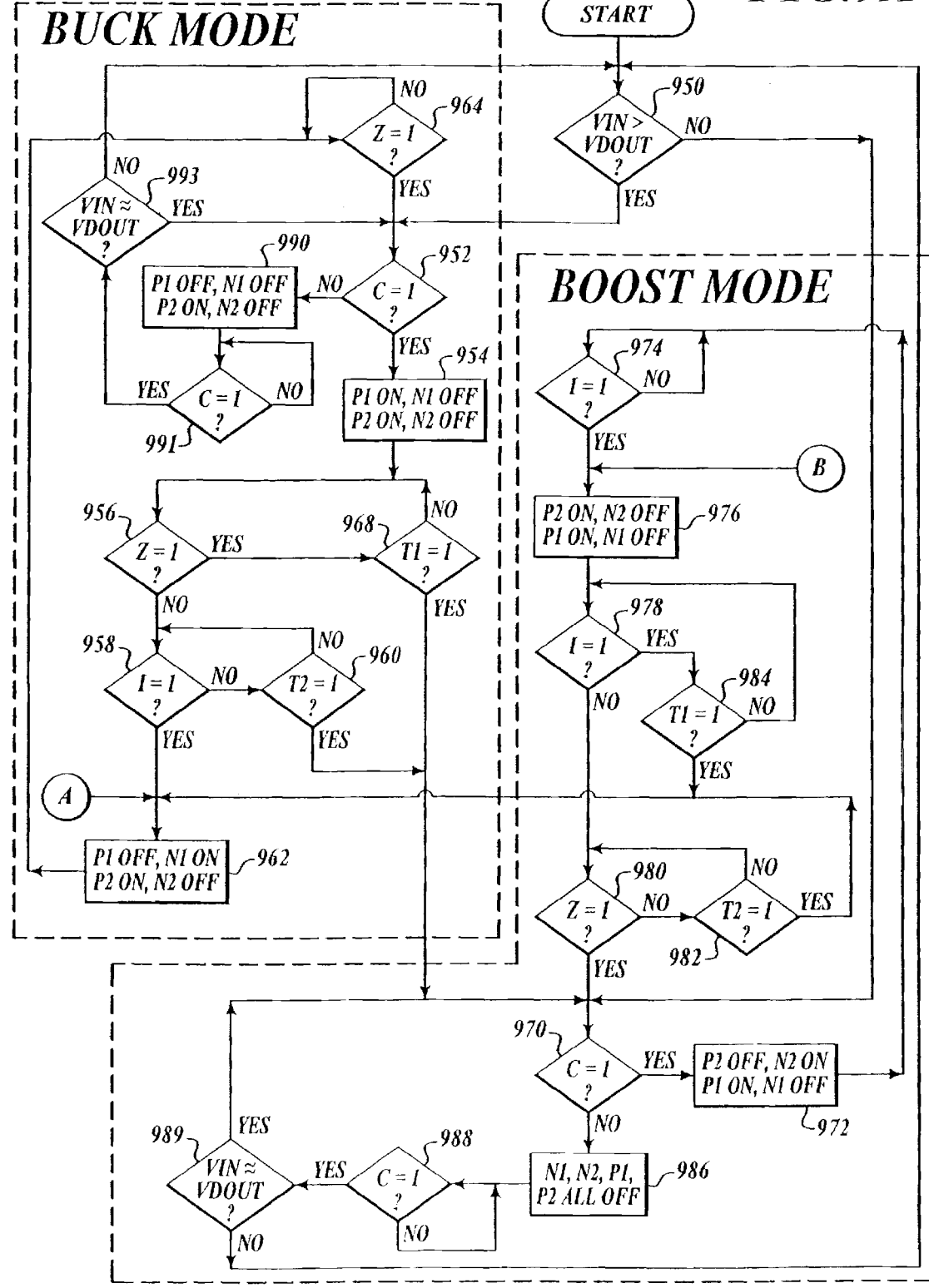
FIGS. 9A-9B illustrate flow charts for an embodiment of a process of PFM BOB switching regulation.
Figure 9B:
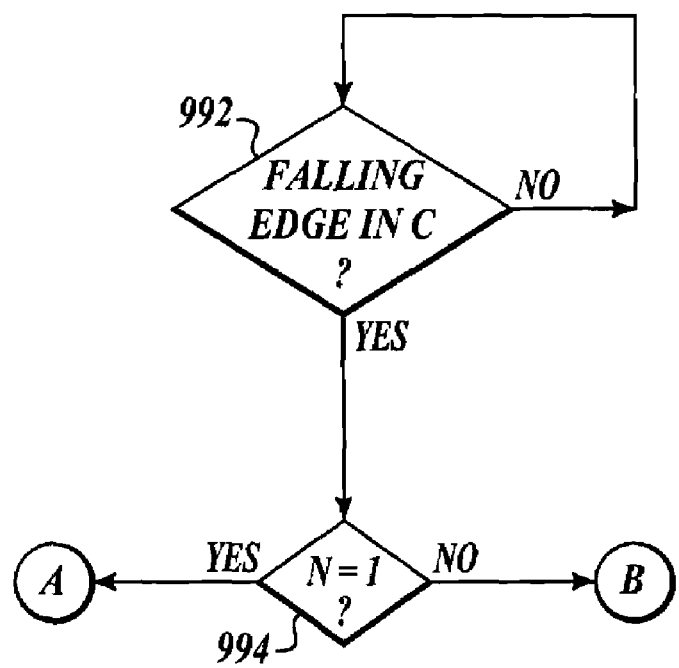

FIGS. 3A-D; FIGS. 4A-D; FIGS. 5A-D; FIGS. 6A-D; FIGS. 7A-D; FIGS. 8A-D; and FIGS. 9A-9B illustrate one example of an embodiment of one algorithm employed by control logic circuit 220 in one particular embodiment. However, the invention is not limited to the specific algorithm illustrated in 3A-D; FIGS. 4A-D; FIGS. 5A-D; FIGS. 6A-D; FIGS. 7A-D; FIGS. 8A-D; and FIGS. 9A-9B and described herein, which is illustrated and described by way of example only.

In FIGS. 3A-D; FIGS. 4A-D; FIGS. 5A-D; FIGS. 6A-D; FIGS. 7A-D; and FIGS. 8A-D, it is assumed that C is high throughout for the sake of simplicity. FIGS. 9A-9B illustrate, inter alia, the cases in which C is low.

The following definitions are employed with regard to the specific algorithm described with regard to FIGS. 3A-D; FIGS. 4A-D; FIGS. 5A-D; FIGS. 6A-D; FIGS. 7A-D; FIGS. 8A-D; and FIGS. 9A-9B. It is understood, however, that these definitions are applied only to this particular algorithm, and that the terms such as Z and I has a broader meaning than the definitions given below outside of the context of the specific algorithm to which the definitions apply.

Z: polarity of the current in P2 (high for current passing from the load to the inductor.
I: magnitude of the current in PI (high for current in PI greater than a fixed current limit value, current direction defined as current from Vin to inductor positive).
C: logic signal from hysteretic comparator observing output voltage relative to a reference voltage.
T1: a fixed time interval has elapsed (high for time out).
T2: a fixed time interval has elapsed (high for time out).
P1b: input logic signal of Buffer (high for turning on P1 and tuning offNI.
P2b: input logic signal of Buffer (high for turning on P2 and turning offN1).

The set of waveforms in FIGS. 3A-3D show the operation in buck mode when the supply voltage (Vin) of the converter is higher than the targeted output voltage (Vdout). In the buck PFM mode, P2b is always high. The control logic block always turns on P2 and turns off N2 in buck mode. Additionally, Switch P1 is turned on after Z is detected high and turned off after I is detected high. The pulse width of Z in buck mode is an inverse function of the difference between Vin and Vout. The smaller the difference of Vin and Vout is, the bigger the pulse width of Z is.

The set of waveforms in FIGS. 4A-4D show the operation in boost mode. If the converter operates in boost mode, P1b is always high. P1 is always on and N1 is always off in boost mode. P2 is turned on after I is detected high and turned off after Z is detected high. Similar to Z signal in buck mode, the pulse width of I in boost mode is an inverse function of the difference of Vin and Vout.

FIGS. 5A-5D illustrate one condition in which buck mode operation is changed to boost mode operation according to the example algorithm. After transferring all the inductor current to output, the converter can't ramp up the inductor current by switching on P1 and P2. One possible scenario is that inductor current stays low until N2 is on and P2 is off (P2b is low). Z's pulse width is measured by the timer corresponding to T1. When Z's pulse width is greater than the time limit (T1), it triggers a change from buck mode to boost mode. Accordingly, at this point P2b toggles and P1b to stays high.

Another condition in which buck mode operation is changed to boost mode operation is shown in FIGS. 6A-6D. FIGS. 6A-6D illustrate a scenario in which the inductor current is ramped up; however, it can't reach the current limit. If the time is greater than T2 without reaching the current limit (I), N2 is turned on and P2 is turned off. On this condition, the operating mode is changed to boost mode operation; accordingly, at this point, P2b starts to toggle and P1b stays high.

FIGS. 7A-7D illustrate one condition in which boost mode operation is changed to buck mode operation. After ramping up the inductor current to the limit, the converter can't ramp down the inductor current by switching on P1 and P2. One possible scenario, as illustrated in FIGS. 7A-7D, is that inductor current stays high until N1 is on and P1 is off (i.e. P1b is low). I's pulse width is measured by the timer associated with T1. When I's pulse width is greater than the time limit (T1), it will trigger buck mode, where P1b toggles and P2b stays high.

FIGS. 8A-8D show another condition in which boost mode is changed to buck mode according to the algorithm. In the scenario illustrated in FIGS. 8A-8D, inductor current is ramped down, but it can't reach the point of zero crossing (Z). Accordingly, the operation is changed to boost mode; at this point, P1b starts to toggle and P2b stays high.

FIGS. 9A-9B illustrates a flow chart for an embodiment of process 900. As discussed above, process 900 is a specific algorithm which is shown by way of example only. Other embodiments are within the scope and spirit of the invention.

After a start block, the process begins at decision block 950, where it is determined whether input comparator output signal N is equal to one. If N is equal to one, this indicates that the input voltage is greater than the desired output voltage. If the determination at decision block 950 is positive, the process proceeds to decision block 952, which is part of the buck mode operation. At decision block 952, it is determined whether hysteretic comparator output signal C is equal to one. If so, the process advances to block 954, at which P1 is on, N1 is off, P2 is on, and N2 is off.

The process then moves to decision block 956, where it is determined whether Z is equal to one. If so, the process moves to decision block 968, where it is determined whether timer T1 has expired. If not, the process proceeds to decision block 956. This loop continues until either Z goes low, or the timer T1 expires before Z goes low.

At decision block 956, if Z is not equal to one, the process advances to decision block 958, where a determination is made as to whether I is equal to one. If not, the process proceeds to decision block 960, where a determination is made as to whether timer T2 has expired. If not, the process moves to decision block 958. This loop continues until either I goes high, or the timer expires before I goes high.

At decision block 958, if I goes high, the process advances to block 962, at which P1 is off, N1 is on, P2 is on, and N2 is off. The process then proceeds to decision block 964, where a determination is made as to whether Z is equal to one. If not, the process continues to loop back to decision block 964. However, if Z is equal to one, the process moves to decision block 952.

At decision block 950, if N is not equal to one, then the process proceeds to decision block 970, which is part of the boost mode operation. At decision block 970, a determination is made as to whether C is one. If not, the process advances to block 972, at which P2 is off, N2 is on, P1 is on, and N1 is off. The process then moves to decision block 974, where a determination is made as to whether I is one. If so, the process proceeds to decision block 984, where a determination is made as to whether timer T1 has expired. If not, the process moves back to decision block 978. The loop continues until either I is not equal to one or timer T1 expires. If the determination at decision block 978 is negative, the process continues to loop back to decision block 974. However, if I is equal to one, the process moves to block 976, at which P2 is on, N2 is off, P1 is on, and N1 is off. The process then advances to decision block 978, where a determination is made as to whether I is equal to one. If not, the process moves to decision block 980, where a determination is made as to whether Z is one. If not, the process proceeds to decision block 982, where a determination is made as to whether timer T2 has expired.

If not, the process moves to decision block 980. This loop continues until either timer T2 expires or Z goes high. If Z goes high, the process advances to decision block 970. However, if timer T2 expires, the process moves to block 962, which is part of buck mode. Similarly, at decision block 984, if the timer expires, the process proceeds to block 962. At decision block 968, if timer T1 expires, the process moves to decision block 970, which is part of boost mode. Similarly, at decision block 960, if timer T2 is high, the process moves to decision block 970.

FIG. 9B illustrates decision block 992. This is an asynchronous check which is made throughout process 900. At any time, if a falling edge occurs in C, the flow illustrated in FIG. 9A is interrupted, and the process moves to decision block 994, where a determination is made as to whether N is equal to one. If so, the process moves to block 962. Otherwise, the process proceeds to block 976.

At decision block 952, if C is low, the process moves to block 990, where a tri-state mode occurs, in which switches P1, N1, P2, and N2 are all off. The process then advances to decision block 991, where a determination is made as to whether C is equal to one. If not, the process loops back to decision block 992 until C is equal to one. If C is equal to one, the process moves to decision block 993.

Similarly, at decision block 970, if C is not equal to one, process advances to block 986, where the tri-state mode occurs, in which switches N1, N2, P1, and P2 are all off. The process then moves to block 988, where a determination is made as to whether C is equal to one. If not, the process loops back to decision block 988 until C is equal to one. If C is equal to one, the process moves to decision block 989.

At decision block 989, a determination is made as to whether Vin is approximately equal to Vdout. In one embodiment, Vin is determined to be approximately equal to Vdout if the comparison is in the hysteresis band of the comparator. If the determination at decision block 989 is positive, the process moves to decision block 970. Otherwise, the process proceeds to decision block 950.

Similarly, at decision block 993, a determination is made as to whether Vin is approximately equal to Vdout. If so, the process moves to decision block 952. Otherwise, the process proceeds to decision block 950.

FIG. 10 illustrates a block diagram of converter 1000, which is an embodiment of converter 100 of FIG. 1. Converter 1000 further includes voltage divider 1021 and voltage divider 1022.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for DC-DC conversion, comprising:
a pulse-frequency modulation buck-or-boost regulator controller that is operable to control regulation of an output voltage, wherein the pulse-frequency modulation buck-or-boost regulator includes:
a first comparator that is arranged to compare a feedback signal to a reference voltage, wherein the feedback signal is based, at least in part, on the output voltage;
a control logic circuit having at least a first input, a second input, a third input, a first output, and a second output, wherein:
the first input of the control logic circuit is coupled to the first comparator;
the control logic circuit is configured to control a first buck switch by providing a first switch control signal at the first output of the control logic circuit such that the first switch control signal causes the first buck switch to remain on throughout boost mode;
the control logic circuit is configured to control a first boost switch by providing a second switch control signal at the second output of the control logic circuit such that the first switch control signal causes the first boost switch to remain on throughout buck mode; and
wherein the control logic circuit is configured to determine whether to operate according to buck mode or boost mode, wherein the determination of whether to change from buck mode to boost mode is based, at least in part, on whether a current through the first boost switch is greater than zero for a first pre-determined period of time.

2. The circuit of claim 1, wherein the control logic circuit is configured to determine whether to operate according to buck mode or boost mode further based, at least in part, on whether a current through the first buck switch is less than a pre-determined value for a second pre-determined period of time.

3. The circuit of claim 1, wherein the control logic circuit is configured such that the determination of whether to change from boost mode to buck mode is based, at least in part, on whether a current through the first boost switch is less than zero for approximately the first pre-determined period of time.

4. The circuit of claim 1, wherein the control logic circuit is configured such that the determination of whether to change from boost mode to buck mode is based, at least in part, on whether a current through the first buck switch is greater than a pre-determined value for a second pre-determined period of time.

5. The circuit of claim 4, wherein the control logic circuit is configured such that the determination of whether to change from boost mode to buck mode is further based, at least in part, on whether a current through the first boost switch is less than zero for approximately the first pre-determined period of time.

6. The circuit of claim 1, further comprising:
a second comparator that is arranged to compare a second feedback voltage to a second reference voltage, and to provide a second comparator output signal based on the comparison, wherein the second feedback signal is based, at least in part, on an input voltage at an input node, wherein the first comparator is a hysteretic comparator, the first comparator is operable to provide a first comparator output signal based on the comparison of the feedback signal with the reference voltage, and wherein the control logic circuit is arranged to receive the first and second comparator output signals.

7. The circuit of claim 6, wherein
the control logic block is configured to, as long as the first comparator output signal remains asserted, cause a change from buck mode to boost mode only if one of the following two conditions occurs:
the current through the first boost switch, passing from a load to an inductor, is greater than zero for a pre-determined period of time; and
the current through the first buck switch, passing from an input node to the inductor, is less than the pre-determined value for the second pre-determined period of time; and
wherein the control logic block is configured to, as long as the first comparator output signal remains asserted, determine a change from boost mode to buck mode only if one of the following two conditions occurs:
the current through the first boost switch, passing from a load to an inductor, is less than zero for a first pre-determined period of time; and
the current through the first buck switch, passing from an input node to the inductor, is greater than the pre-determined value for the second pre-determined period of time.

8. The circuit of claim 6, wherein
the control logic block is configured to determine a change from buck mode to boost mode only if one of the following three conditions occurs:
the current through the first boost switch, passing from a load to an inductor, is greater than zero for a pre-determined period of time while the first comparator output signal is asserted;
the current through the first buck switch, passing from an input node to the inductor, is less than the pre-determined value for the second pre-determined period of time while the first comparator output signal is asserted; and
a rising edge occurs in the first comparator output signal and the second comparator output signal is unasserted; and wherein the control logic block is configured to determine a change from boost mode to buck mode if and only if one of the following three conditions occurs:
the current through the first boost switch, passing from a load to an inductor, is less than zero for a first pre-determined period of time while the first comparator output signal is asserted;
the current through the first buck switch, passing from an input node to the inductor, is greater than the pre-determined value for the second pre-determined period of time while the first comparator output signal is asserted; and
a rising edge occurs in the first comparator output signal and the second comparator output signal is asserted.

9. A circuit for DC-DC conversion, comprising:
a first buck switch that is coupled between an input voltage node and a first switch node;
a second buck switch that is coupled to the first switch node;
a first boost switch that is coupled between a second switch node and an output voltage node;
a second boost switch that is coupled to the second switch node;
a pulse-frequency modulation buck-or-boost regulator controller, including:
a first comparator having a first input that is coupled to a first feedback node, a second input that is coupled to a first reference node, and an output;
a control logic circuit that includes at least a first input that is coupled to the output of the first comparator, wherein:
the control logic circuit is configured to, during a buck regulation mode, cause the first boost switch to remain on and the second buck switch to remain off;
the control logic circuit is configured to, during a boost regulation mode, cause the first buck switch to remain on and the second buck switch to remain off; and
wherein the control logic circuit is configured to determine whether to change regulation from buck mode to boost mode based, at least in part, on whether a current through the first buck switch is less than a pre-determined value for a pre-determined period of time.

10. The circuit of claim 9, wherein
the pulse-frequency modulation buck-or-boost regulator controller further includes a second comparator having a first input that is coupled to the second switch node, a second input that is coupled to a second reference voltage node, and an output that is coupled to the second input of the control logic circuit.

11. The circuit of claim 9, wherein
the pulse frequency modulation buck-or-boost regulator controller further includes a second comparator having a first input that is coupled to a second feedback node, a second input that is coupled to a second reference node, and an output, wherein the first comparator is arranged to receive a first feedback signal at the first feedback node; the first feedback signal is based, at least in part, on the output voltage; the second comparator is arranged to receive a second feedback signal at the second feedback node; and wherein the second feedback signal is based, at least in part, on the input voltage.

12. The circuit of claim 9, wherein
the pulse-frequency modulation buck-or-boost regulator controller further includes a second comparator having a first input that is coupled to the first switch node, a second input that is coupled to a second reference voltage node, and an output that is coupled to the second input of the control logic circuit.

13. The circuit of claim 12, wherein
the pulse-frequency modulation buck-or-boost regulator controller further includes a third comparator having a first input that is coupled to the second switch node, a second input that is coupled to a third reference voltage node, and an output that is coupled to the third input of the control logic circuit.

14. The circuit of claim 13, wherein
the pulse frequency modulation buck-or-boost regulator controller further includes a fourth comparator having a first input that is coupled to a second feedback node, a second input that is coupled to a fourth reference node, and an output, wherein the first comparator is arranged to receive a first feedback signal at the first feedback node, wherein the first feedback signal is based, at least in part, on the output voltage; and wherein the fourth comparator is arranged to receive a second feedback signal at the second feedback node, wherein the second feedback signal is based, at least in part, on the input voltage.

15. A method for DC-DC conversion, comprising:
at power-on, making an initial determining as to whether to operate in buck mode or boost mode;
during boost mode, performing boost regulation to provide an output voltage, wherein performing boost regulation includes:
    opening and closing a first boost switch based on pulse frequency modulation; and
    keeping a first buck switch closed during boost mode;
during buck mode, performing buck regulation to provide an output voltage, wherein performing buck regulation includes:
    opening and closing a first buck switch based on pulse frequency modulation; and
    keeping a first boost switch closed during buck mode;
during buck mode, determining whether to change from buck mode to boost mode; and
during boost mode, determining whether to change from boost mode to buck mode, wherein the determination of whether to change from buck mode to boost mode is based, at least in part, on whether a current through the first boost switch is greater than zero for a pre-determined period of time.

16. A method for DC-DC conversion, comprising:
at power-on, making an initial determining as to whether to operate in buck mode or boost mode;
during boost mode, performing boost regulation to provide an output voltage, wherein performing boost regulation includes:
    opening and closing a first boost switch based on pulse frequency modulation; and
    keeping a first buck switch closed during boost mode;
during buck mode, performing buck regulation to provide an output voltage, wherein performing buck regulation includes:
    opening and closing a first buck switch based on pulse frequency modulation; and
    keeping a first boost switch closed during buck mode;
during buck mode, determining whether to change from buck mode to boost mode; and
during boost mode, determining whether to change from boost mode to buck mode, wherein the determination of whether to change from buck mode to boost mode is based, at least in part, on whether a current through the first buck switch is less than the pre-determined value for a pre-determined period of time.

17. A method for DC-DC conversion, comprising:
at power-on, making an initial determining as to whether to operate in buck mode or boost
during boost mode, performing boost regulation to provide an output voltage, wherein performing boost regulation includes:
    opening and closing a first boost switch based on pulse frequency modulation; and
    keeping a first buck switch closed during boost mode;
during buck mode, performing buck regulation to provide an output voltage, wherein performing buck regulation includes:
    opening and closing a first buck switch based on pulse frequency modulation; and
    keeping a first boost switch closed during buck mode;
during buck mode, determining whether to change from buck mode to boost mode; and
during boost mode, determining whether to change from boost mode to buck mode, wherein the determination of whether to change from boost mode to buck mode is based, at least in part, on whether a current through the first boost switch is less than zero for approximately the first pre-determined period of time.

18. The method of claim 17, wherein the determination of whether to change from boost mode to buck mode is further based, at least in part, on whether a current through the first buck switch is greater than a pre-determined value for a pre-determined period of time.

19. The method of claim 17, further comprising:
employing a first voltage divider to provide a first feedback voltage from the output voltage;
employing a hysteretic comparator to provide a first comparator output signal based on a comparison of the first feedback voltage with a first reference voltage;
employing a second voltage divider to provide a second feedback voltage from an input voltage; and
employing another comparator to provide a second comparator output signal based on a comparison of the second feedback voltage with the first reference voltage.

20. The method of claim 19, wherein
changing from buck mode to boost mode occurs only if one of the following three conditions occurs:
    the current through the first boost switch, passing from a load to an inductor, is greater than zero for a pre-determined period of time while the first comparator output signal is asserted;
    the current through the first buck switch, passing from an input node to the inductor, is less than the pre-determined value for the second pre-determined period of time while the first comparator output signal is asserted; and
    a rising edge occurs in the first comparator output signal and the second feedback signal is greater than the second reference voltage; and
wherein changing from boost mode to buck mode occurs if and only if one of the following three conditions occurs:
    the current through the first boost switch, passing from a load to an inductor, is less than zero for a first pre-determined period of time while the first comparator output signal is asserted;
    the current through the first buck switch, passing from an input node to the inductor, is greater than the pre-determined value for the second pre-determined period of time while the first comparator output signal is asserted; and a rising edge occurs in the first comparator output signal and the second feedback signal is less than the second reference voltage.

21. A circuit for DC-DC conversion, comprising:

a first buck switch that is coupled between an input voltage node and a first switch node;

a second buck switch that is coupled to the first switch node;

a first boost switch that is coupled between a second switch node and an output voltage node;

a second boost switch that is coupled to the second switch node;

a pulse-frequency modulation buck-or-boost regulator controller that is arranged to control regulation of the output voltage so that the output voltage is regulated to a value that is based on a reference voltage, wherein the pulse-frequency modulation buck-or-boost regulator controller includes:

a first comparator having a first input that is coupled to a first feedback node, a second input that is coupled to a first reference node, and an output;

a control logic circuit that includes at least a first input that is coupled to the output of the first comparator, wherein:

the control logic circuit is configured to, during a buck regulation mode, cause the first boost switch to remain on and the second buck switch to remain off;

the control logic circuit is configured to, during a boost regulation mode, cause the first buck switch to remain on and the second buck switch to remain off, and wherein the control logic circuit is configured to determine whether to change regulation from boost mode to buck mode based, at least in part, on whether a current through the first buck switch is greater than a pre-determined value for a pre-determined period of time, wherein the pulse-frequency modulation buck-or-boost regulator controller continues to regulate the output voltage to a value that is based on the reference voltage when the regulation changes from boost mode to buck mode based, at least in part, on whether a current through the first buck switch is greater than a pre-determined value for a pre-determined period of time.

\* \* \* \* \*

UNITED STATES PATENT AND TRADEMARK OFFICE
CERTIFICATE OF CORRECTION

PATENT NO. : 7,495,419 B1  Page 1 of 1
APPLICATION NO. : 11/397425
DATED : February 24, 2009
INVENTOR(S) : Shu-Ing Ju It is certified that error appears in the above-identified patent and that said Letters Patent is hereby corrected as shown below:

On the Title page Item [56], under "Other Publications", column 2, line 12, delete "Converence" and insert -- Conference --, therefor.

On the Title page Item [56], under "Other Publications", column 2, line 15, delete "Speialists" and insert -- Specialists --, therefor.

On Title page 2 Item [56], under "Other Publications", column 1, line 5, delete "Electonics" and insert -- Electronics --, therefor.

In column 5, line 58, delete "PI" and insert -- P1 --, therefor.

In column 5, line 58, delete "PI" and insert -- P1 --, therefor.

In column 5, line 67, delete "offNI" and insert -- off N1). --, therefor.

In column 6, line 2, delete "offN1)." and insert -- off N1). --, therefor.

In column 12, line 6, in Claim 17, delete "boost" and insert -- boost mode; --, therefor.

In column 14, line 11, in Claim 21, delete "off," and insert -- off; --, therefor.

Signed and Sealed this

Twenty-eighth Day of April, 2009

JOHN DOLL
*Acting Director of the United States Patent and Trademark Office*